Sept. 29, 1964     R. J. RUMPF     3,150,746
AUTOMATIC BRAKE ADJUSTER
Filed Jan. 2, 1962
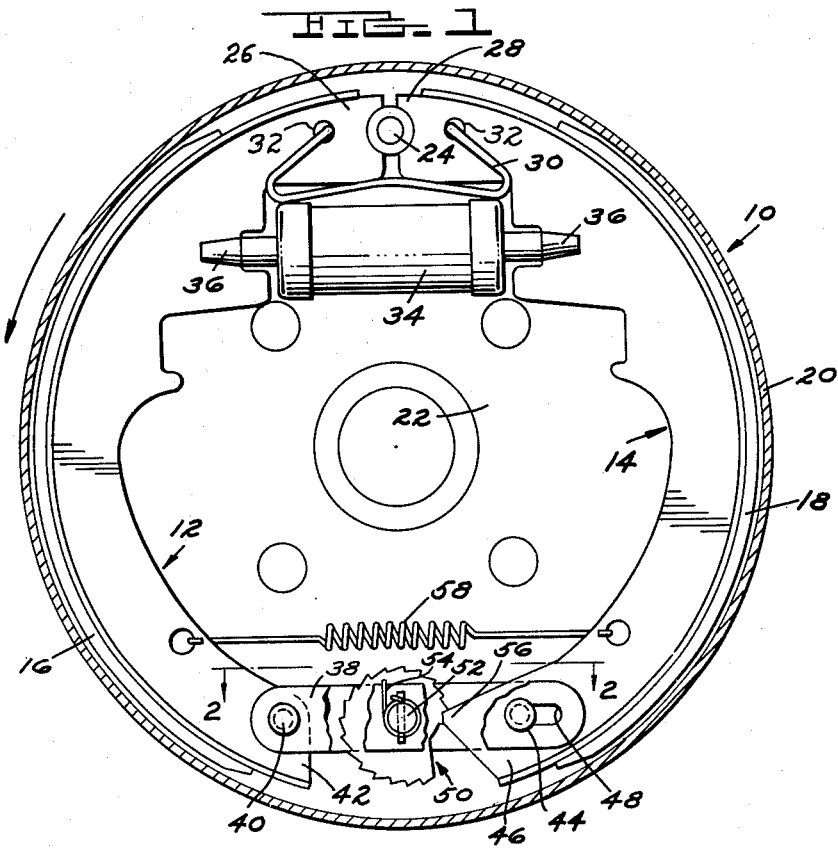
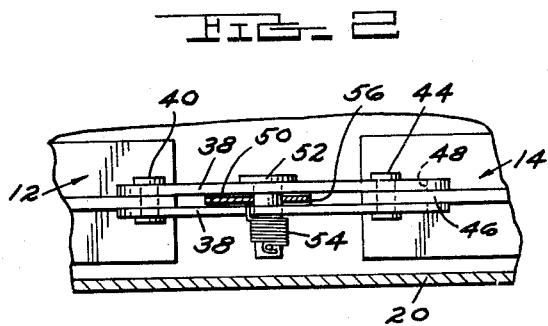
ROBERT J. RUMPF
INVENTOR.
BY John R. Faulkner
Clifford L. Sadler
ATTORNEYS

United States Patent Office 3,150,746
Patented Sept. 29, 1964

3,150,746
AUTOMATIC BRAKE ADJUSTER
Robert J. Rumpf, Dearborn, Mich., assignor to Ford Motor Company, Dearborn, Mich., a corporation of Delaware
Filed Jan. 2, 1962, Ser. No. 163,583
3 Claims. (Cl. 188—79.5)

The present invention relates generally to vehicle brakes and more particularly to an internal shoe brake having automatic means to compensate for brake lining wear.

It has been long appreciated in the automotive brake field that automatic means for compensating for brake linear wear are highly desirable. The brake art is crowded with evidence of the efforts expended to develop a commercially successful automatic brake adjuster. A majority of the designs are objectionable because of excessive cost and mechanical unreliability. Over-adjustment is another common fault.

Therefore, it is the principal object of this invention to provide an automatic adjuster for internal shoe automatic brake that is characterized by its simplicity and reliability.

To meet this objective one specific embodiment of this invention has a pair of arcuate brake shoes that are secured to a brake backing plate and have an upper pair of adjacent ends in engagement with an anchor pin. The brake shoes have a lower pair of adjacent ends that are in engagement with an intermediate ratchet wheel. The ratchet wheel has a step cam configuration and is spring pressed to control the minimum separation of the lower ends. An appropriately placed retractor spring holds the upper shoe ends in engagement with the anchor pin so that when a hydraulic cylinder adjacent to the anchor pin is actuated, the shoes will pivot about the anchor pin and separate at their lower ends. The separation will continue until the shoes touch the brake drum. If the separation is excessive, indicating brake lining wear, the ratchet wheel will rotate to reduce the minimum clearance.

The brake adjustment caused by the rotation of the ratchet wheel will occur only during the initial stage of brake application. Once the shoes touch the drum, servo-action will cause the upper end of the primary brake shoe to leave the anchor pin and close the separation between the lower ends.

The advantages of an automatic brake adjuster constructed in accordance with this invention will become apparent from the following description and the accompanying drawings in which:

FIGURE 1 is an elevational view of a vehicle brake incorporating a novel adjuster mechanism; and, FIGURE 2 is a sectional view taken along section lines 2—2 of FIGURE 1.

Referring now to the drawings, in FIGURE 1 a vehicle brake assembly 10 is shown. Brake 10 includes primary and secondary brake shoes 12 and 14. The shoes 12 and 14 have brake linings 16 and 18 positioned in facing relationship with a brake drum 20.

Spring means are provided to hold the shoes against a brake backing plate 22. An anchor pin 24 is rigidly secured to the backing plate 22. The upper ends 26 and 28 of the reinforcing webs of the shoes 12 and 14 are held against the anchor pin 24 by retractor spring 30. The retractor spring 30 has its ends secured in holes 32 of the shoe web ends 26 and 28 in alignment with the anchor pin 24.

A hydraulic wheel cylinder 34 is affixed to the brake backing plate 22 just below the anchor 24. Actuator links 36 extending from the wheel cylinder 34 and engage the webs of the shoes 12 and 14 at a point spaced apart from their engagement with the anchor pin 24.

A pair of links 38 are pivotally connected by a pin 40 to the lower end of the web of the primary shoe 12. The links 38 extend across the brake assembly 10 and are connected by a pin 44 with the lower end 46 of the web of the secondary shoe 14. An elongated slot 48 is provided in the links 38 to permit radial displacement between the shoes 12 and 14.

A ratchet wheel 50 is rotatably carried by a pin 52 which passes through the pair of links 38. A coil spring 54 surrounds the pin 52, and has one end in engagement with the ratchet wheel 50 to urge it into rotation in a clockwise direction. The ratchet wheel 50 has a step cam periphery of progressively increasing radius. A pawl portion 56 is provided at the tip of the lower end 46 of the secondary shoe 14. The pawl portion 56 engages the ratchet wheel 50. A retractor spring 58 is connected between the shoes 12 and 14, and lightly urges the pawl 56 into engagement with the ratchet wheel 50.

In operation, when the wheel cylinder 34 is activated to cause the actuator links 36 to press against the primary and secondary shoes 12 and 14, the shoes will pivot about the anchor pin 24 causing the lower shoe ends to separate first. The location and strength of the upper retractor spring 30 is designed to hold the web ends 26 and 28 in engagement with the anchor pin 24 until the linings 16 and 18 come into contact with the brake drum 20.

The separation of the lower ends of the shoes 12 and 14 is permitted by the lost motion slots 48. When the linings 16 and 18 come into contact with the drum 20, the end 26 of the primary shoe 12 will move away from the anchor pin 24 and the shoe 12 will tend to rotate with the drum 20. This movement of the primary shoe 12 will close the separation that initially existed between the ratchet wheel 50 and the pawl portion 56 at the inception of the brake application.

If there has been brake lining wear, the lower ends of the brake shoes 12 and 14 will separate to a greater extent before they come into contact with the drum 20. If the lining wear has been of a sufficient degree, the pawl portion 56 of the secondary shoe 14 will become disengaged from the ratchet wheel 50 and permit the spring 54 to rotate the wheel 50 one step. Because the wheel 50 is of progressively increasing diameter, the wheel 50 will rotate only a single step at a time. Each step of rotation will constitute a brake adjustment and reduce the minimum separation of the lower ends of the shoes 12 and 14 when the brake assembly 10 is returned to a static condition. This controls the minimum static clearance between the linings 16 and 18 and the drum 20.

Brake adjustment occurs just prior to the moment the linings 16 and 18 contact the drum 20. Once the linings 16 and 18 come into contact with the drum 20, servo-action causes the primary shoe 12 to rotate and close the gap between the pawl 56 and wheel 50. At that time servo-force is transferred from the primary shoe 12 through the ratchet wheel 50 to the secondary shoe 14.

The foregoing description constitute the presently preferred embodiment of this invention. Modifications and alterations may occur to those skilled in the art which will come within the scope and spirit of the following claims.

I claim:

1. A brake assembly having a backing plate and a pair of arcuate brake shoes movably connected to said backing plate;

said shoes having first and second adjacent ends;
an anchor pin secured to said backing plate;
spring means urging said first ends into engagement with said anchor pin;
actuating means adapted to separate said second ends by pivotal movement of said shoes about said anchor pin;
a ratchet wheel secured to one of said second ends;
spring means tending to rotate said ratchet wheel;
said ratchet wheel having a progressively increasing diameter;
the other of said second ends having a pawl portion engaging said ratchet wheel; and
spring means urging said pawl portion into engagement with said ratchet wheel.

2. A brake assembly having a backing plate and a pair of arcuate brake shoes movably connected to said backing plate;
said shoes having first and second adjacent ends;
an anchor pin secured to said backing plate;
spring means urging said first ends into engagement with said anchor pin;
actuating means adapted to separate said second ends by pivotal movement of said shoes about said anchor pin;
link means interconnecting said second ends;
a ratchet wheel rotatably secured to said link means;
said ratchet wheel having a progressively increasing diameter;
the other of said second ends having a pawl portion engaging said ratchet wheel; and,
spring means urging said pawl portion into engagement with said ratchet wheel.

3. A brake assembly having a backing plate and a pair of arcuate brake shoes movably connected to said backing plate;
an annular brake drum rotatably disposed with respect to said shoes;
said shoes having first and second adjacent ends;
an anchor secured to said backing plate;
first spring means urging said first ends into engagement with said anchor;
brake applying means adapted to move said shoes into engagement with said drum;
said brake applying means being further adapted to separate said second ends by pivotal movement of said shoes about said anchor prior to the engagement of said shoes with said drum;
wheel means secured to one of said second ends and having a progressively increasing diameter;
means secured to the other of said second ends and engaging said wheel means;
a spring urging said last defined means into engagement with said wheel means;
said spring being interposed between said second ends and resiliently urging said second ends towards each other.

References Cited in the file of this patent
UNITED STATES PATENTS

| | | |
|---|---|---|
| 2,168,646 | Goepfrich | Aug. 8, 1939 |
| 2,670,059 | Link | Feb. 23, 1954 |
| 2,788,095 | Brooks | Apr. 9, 1957 |